(No Model.)
4 Sheets—Sheet 1.
F. JEHL.
DYNAMO ELECTRIC MACHINE.
No. 376,307. Patented Jan. 10, 1888.
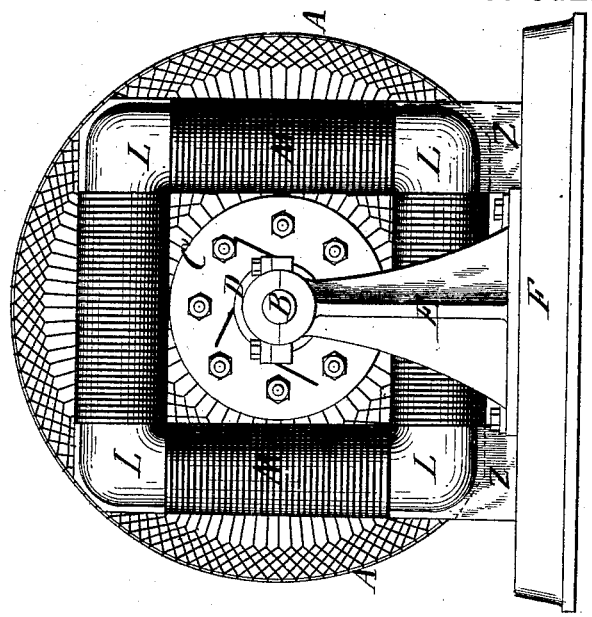
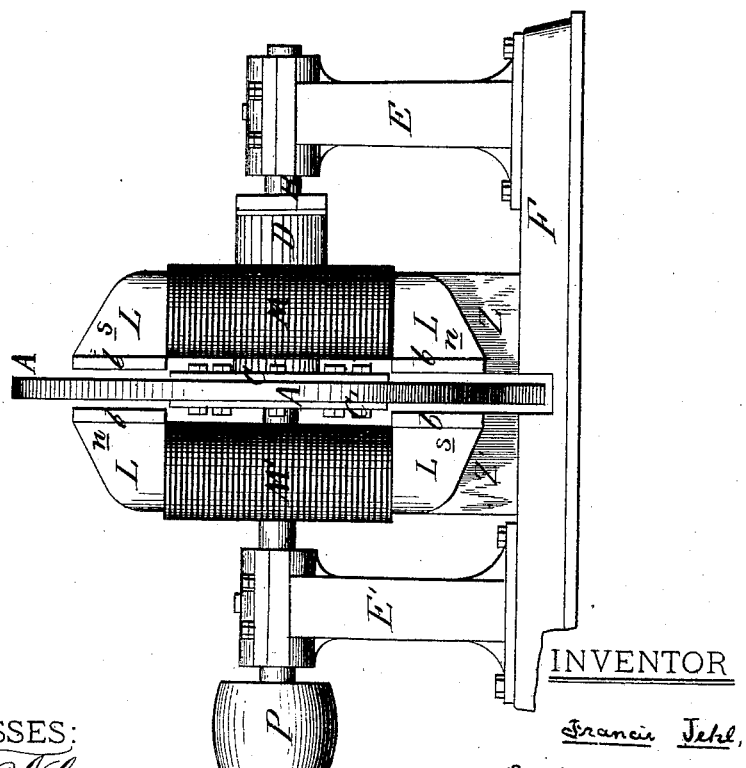
WITNESSES:
John F. Nelson
George W. Powell
INVENTOR
Francis Jehl,
By his Attorneys,
Arthur C. Fraser &c.

(No Model.) 4 Sheets—Sheet 2.
F. JEHL.
DYNAMO ELECTRIC MACHINE.
No. 376,307. Patented Jan. 10, 1888.
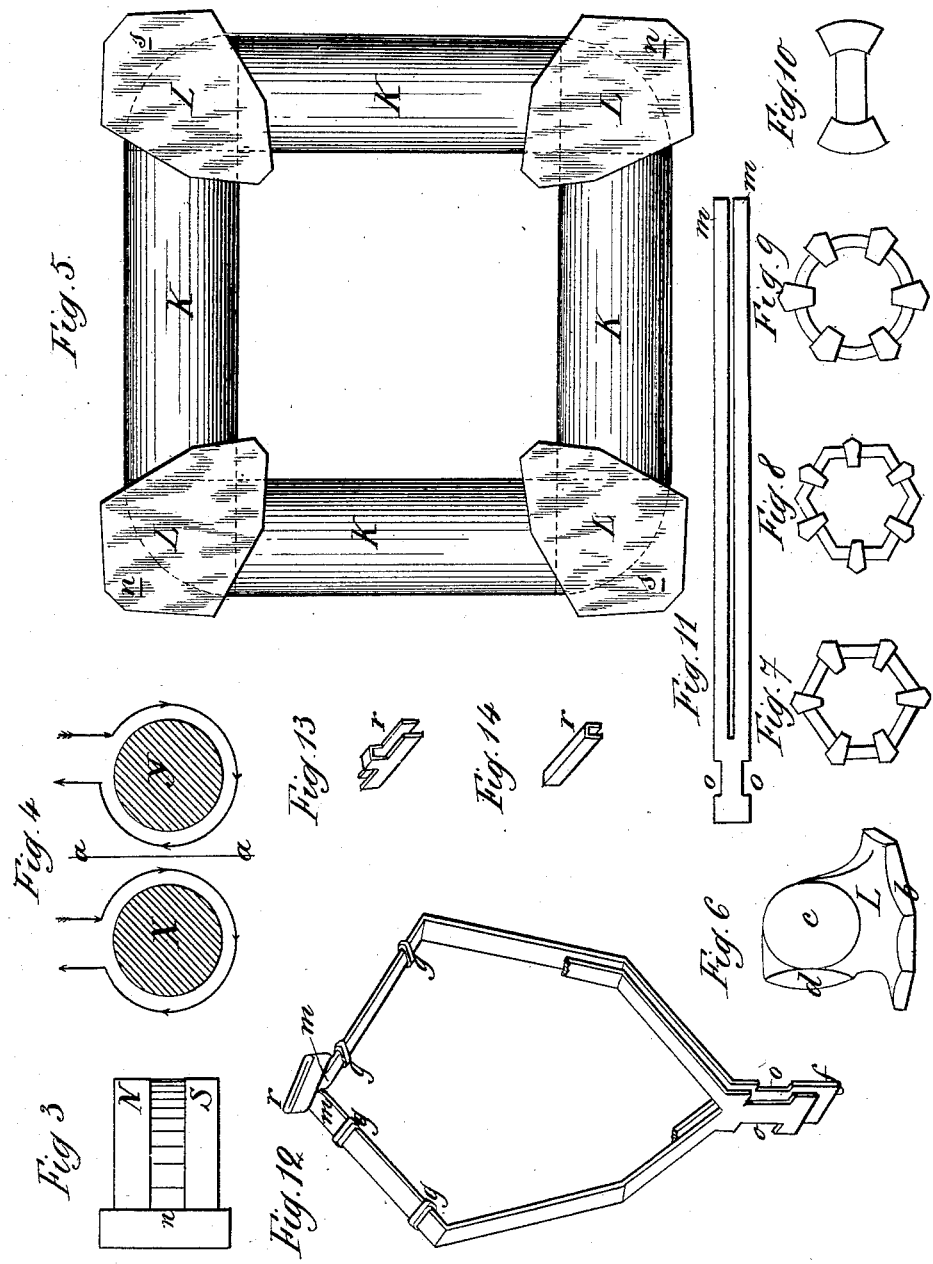
WITNESSES:
John F. Nelson
George W. Powell
INVENTOR:
Francis Jehl,
By his Attorneys,
Arthur E. Craver & Co.

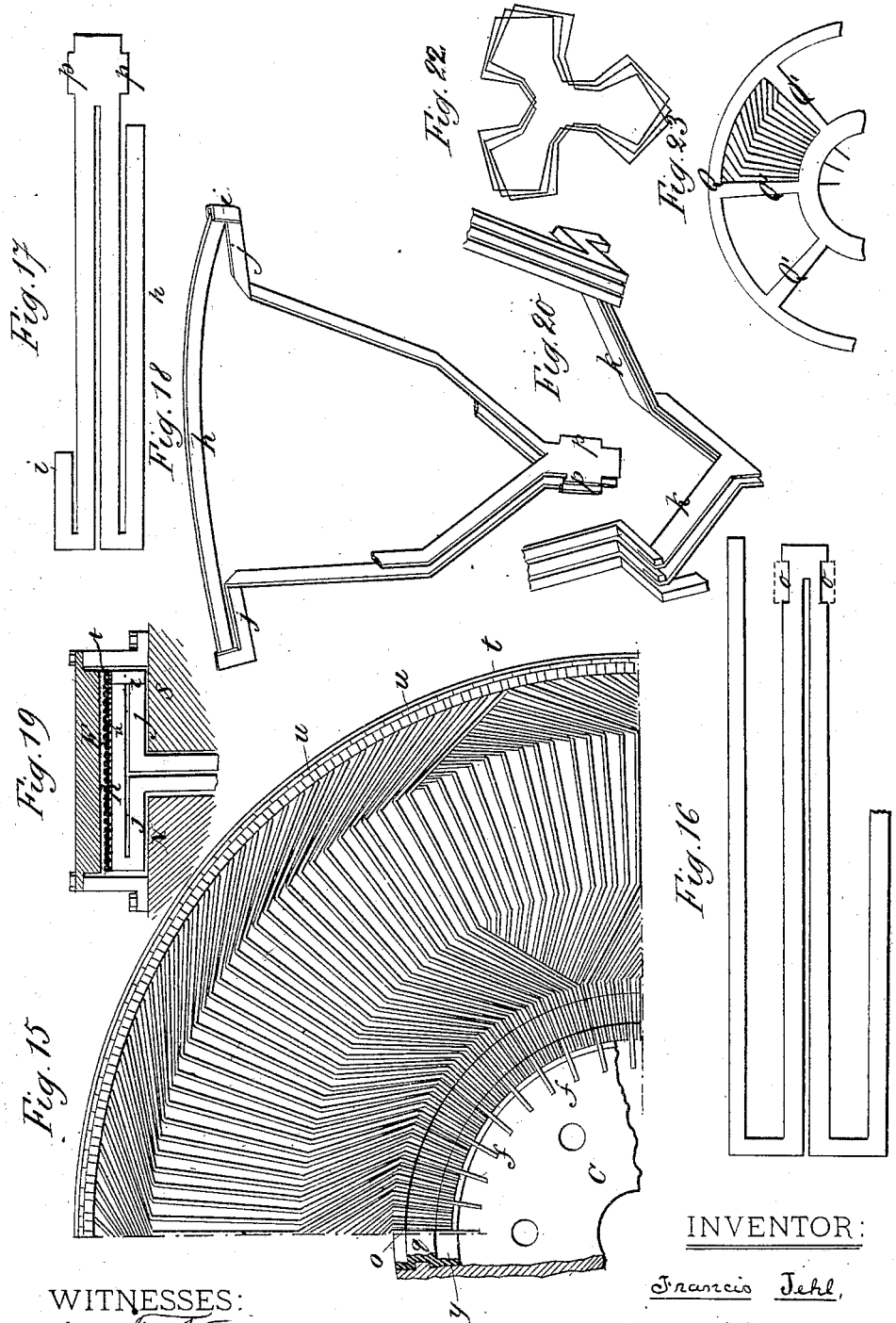

(No Model.)  4 Sheets—Sheet 4.
F. JEHL.
DYNAMO-ELECTRIC MACHINE.
No. 376,307.  Patented Jan. 10, 1888.
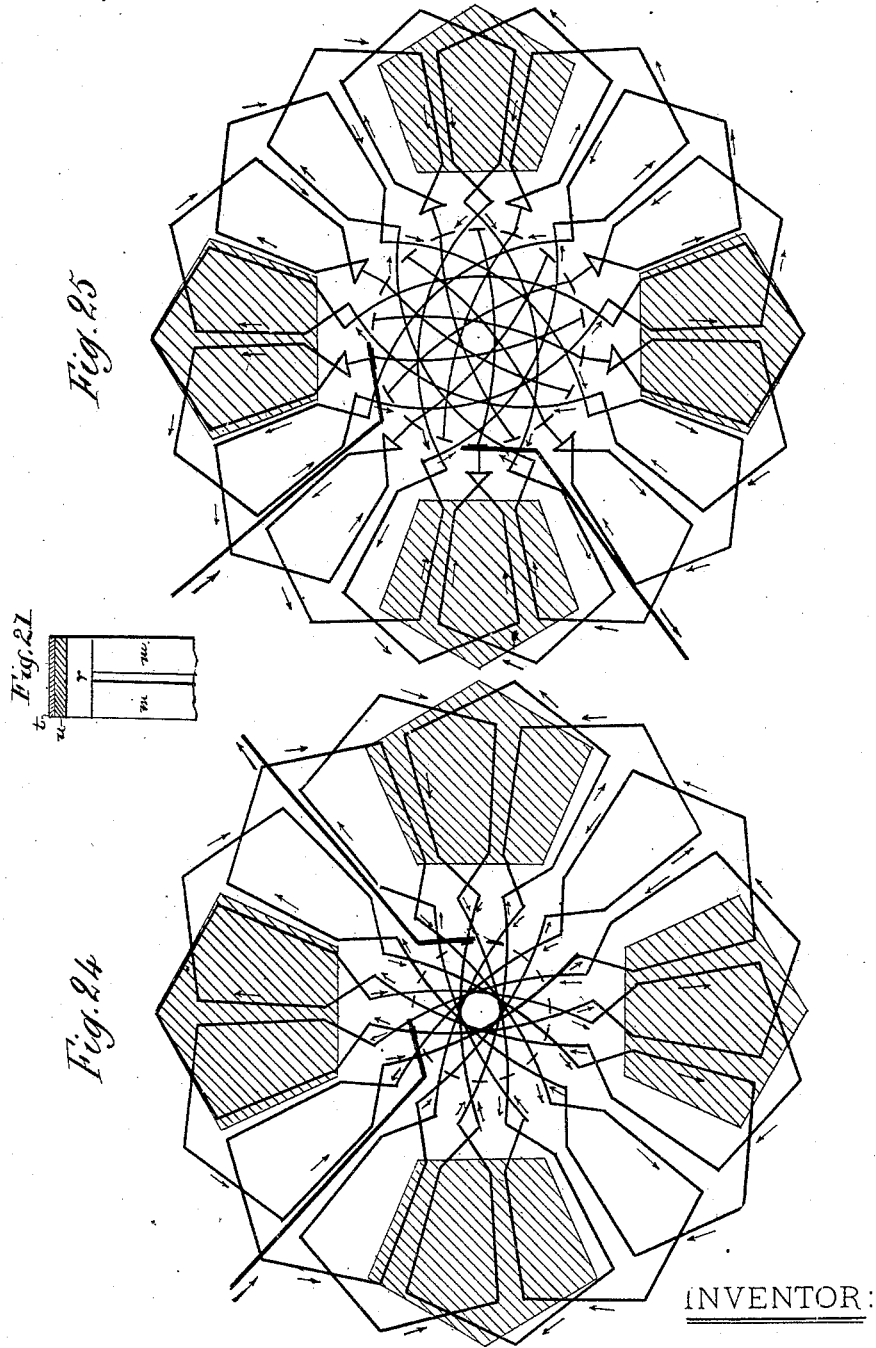
WITNESSES:
John F. Nelson.
George W. Powell
INVENTOR:
Francis Jehl,
By his Attorneys,
Arthur G. Fraser &Co

UNITED STATES PATENT OFFICE.

FRANCIS JEHL, OF PARIS, FRANCE, ASSIGNOR TO THE SOCIÉTÉ ANONYME COMPAGNIE CONTINENTALE EDISON, OF SAME PLACE.

DYNAMO-ELECTRIC MACHINE.

SPECIFICATION forming part of Letters Patent No. 376,307, dated January 10, 1888.

Application filed February 28, 1887. Serial No. 229,097. (No model.)

*To all whom it may concern:*

Be it known that I, FRANCIS JEHL, a citizen of the United States, residing in Paris, France, have invented certain new and useful Improvements in Magneto or Dynamo Electric Machines, of which the following is a specification.

This invention relates to magneto or dynamo electric machines, useful either as generators of electricity or as electromotors, of that class known as "disk-dynamos" or "flat-ring dynamos."

In all machines of this class it is sought to provide a very strong magnetic field or inductor, which is accomplished by putting the magnets very close together. It is also sought to avoid heating of the armature, caused by Foucault currents in the iron core. It is desirable, also, to utilize all the copper of the armature by putting it all in the magnetic field, as distinguished from machines having a drum-armature, in which last the wire at the two ends serves only to complete the circuit without augmenting in the least the production of the machine.

My present invention provides a new system of dynamo or magneto electric generator of this class, which aims to avoid the defects inherent in the machines now in use.

In my machine the disk-armature is characterized by the combination of coils grouped around a central spindle, each coil being formed by means of a strip of copper slitted longitudinally, with its two parts spread apart and bent into polygonal form. This arrangement presents the following advantages: It permits of giving the same surface to each turn of the coil, one half being disposed on one side of the armature and the other half on the other side. It permits of the several coils being fitted together with the utmost compactness, which enables the armature to be provided with the greatest possible number of coils, and it enables the disk-armature to be made as thin as possible, so that the field-magnets may be brought very close together, thereby acquiring a very intense magnetic field and utilizing the coils to the best advantage.

I will now proceed to describe my machine with reference to the accompanying drawings, wherein—

Figure 1 is a side elevation of my improved dynamo or motor. Fig. 2 is an end elevation thereof. Figs. 3 and 4 are explanatory diagrams. Fig. 5 is an elevation of one of the field-magnets removed, on a somewhat larger scale than Fig. 2. Fig. 6 is a perspective view of one of the pole-pieces of the field-magnets. Figs. 7, 8, 9, and 10 are views corresponding to Fig. 5, but on a much smaller scale, and illustrating several modified forms of field-magnets. Fig. 11 is a plan of one of the slitted strips of copper used in making the armature-coils. Fig. 12 is a perspective view showing one of the armature convolutions detached. Figs. 13 and 14 are perspectives of clasps or clamping-pieces used in making the armature. Fig. 15 is an enlarged face view of one-quarter of the armature-winding, partially dissected. Figs. 16 to 20 illustrate different constructions embodying further features of my invention. Fig. 21 is a transverse section of the construction shown in Fig. 15. Figs. 22 and 23 are diagrams illustrating modifications, and will be described hereinafter. Figs. 24 and 25 are diagrams illustrating two different methods of connecting the armature-coils with the commutator.

I will first describe the machine in general, with reference particularly to Figs. 1 and 2.

Let A designate the disk-armature, the construction of which I will describe in detail later on. It is clamped between two plates or disks, C C, mounted on the rotary spindle or shaft B, which has bearings in frames E E'. The shaft B carries the commutator D and belt-pulleys P, as usual. The frames E E' are fixed on a base or foundation plate, F, on which, also, are rigidly mounted two field-magnets, M and M', which are arranged on opposite sides of the armature. The field-magnets are connected to the base F through the medium of pieces of zinc Z Z', which isolate them magnetically therefrom. The poles of each field-magnet are alternately of north and south polarity, and each pair of opposed poles of the two magnets presents opposite polarities, the pole on one side of the armature being a north pole, while the one on the other side is a south pole.

Having now given a general idea of the arrangement and construction of my new machine, I will proceed to explain its characteristic features more in detail.

It is well known that in the present disk machines the electro-motive force is not produced, as in the Gramme ring or Siemens drum machines, by the movement of the windings in a nearly homogeneous magnetic field, but that it is due to the passage of the windings through a magnetic field that is not uniform—that is to say, in a field the polarity of which changes at regular angular intervals. The electro-motive force is thus proportional, first, to the surface of each coil of the armature or winding; second, to the number of coils; third, to the intensity of the entire magnetic field; fourth, to the number of magnetic poles in the series, and, fifth, to the speed of the armature.

Now, in all disk machines made up to the present there is employed a great number of little electro-magnets, the cores of which are parallel to the axis of the armature. I use, on the contrary, a small number of magnets, but a considerable mass of iron. These magnets have the advantage over the preceding that, for the same force of magnetization the intensity of the magnetic field produced by two simple opposed magnets of great mass is greater than the sum of the magnetic fields produced by several pairs of small magnets of the same total mass.

Another source of loss of magnetism in the existing disk machines is due to the parallel position of each group of two cores of adjacent magnets. Let us suppose, referring to Fig. 3, that N and S are respectively the north pole of one electro-magnet and the south pole of another. A considerable part of the lines of force pass from one of these magnets to the other, as indicated, instead of going directly to the opposite poles of the second series of electro-magnets on the opposite side of the armature. These lines of force, although becoming gradually less dense as they approach the neutral point n, pass always to some extent between the neighboring magnets, and thus create lateral magnetic fields, which are not traversed by the armature, and which consequently are useless for the production of current.

Efforts have recently been made to increase the magnetic capacity of the system of magnets by putting the magnetic poles in short circuit in a particular way, known as "bridge-mounting." According to this arrangement, all the poles situated on the same side of the armature are of the same name. Consequently the electro-motive force is due only to the approach and recession of the coils of the armature toward and from the places where the intensity of the simple magnetic field becomes greatest or least, and this electro-motive force is necessarily less than if the polarity of the field were alternated. Furthermore, certain parts of the winding are rendered inaccurate, as will be apparent from the diagram Fig. 4, where X and Y show sections of two cores destined to give the same polarity—two north poles, for example. The current circulates in the same direction around these two cores. It results from this that in the intermediate space the two currents flow in opposite directions to each other, which produces at a a a neutralization of the magnetic forces. There is thus in this space no magnetic effect, since each current opposes the other. This effect is produced likewise in those machines where multiple magnets are employed—that is to say, more than one core for one polarity. These defects are avoided by my new disposition of the field-magnets, which I will now describe.

As shown in Figs. 2 and 5, I have taken four poles—two north and two south—the poles of the same name being arranged diagonally opposite to one another. These poles, with their connecting cores, constitute a square, which forms one of the two halves of the magnetic system. This square is placed on one side of the disk-armature, and its cores are consequently parallel to the plane of the armature and at right angles to the axis of rotation. On the other side of the disk-armature is placed another like square, but arranged in such manner that the poles of the two squares which come opposite to one another are of contrary polarity, as indicated by the letters s n in Fig. 1.

The two sides of the magnetic system, having a considerable mass of iron, produce an alternative magnetic field of great strength and density, and the armature moves through all parts of this magnetic field.

The field-magnet squares are formed of large massive cores, K K of soft iron, on which is wound the wire, and which are joined through the medium of pole-pieces L L, which may be made of only one piece and which are of the general form represented in Fig. 6, having a flat face, b, which is presented toward the armature, and two plain parts, c d, against which fit the ends of the cores K K, which are fixed to them in any manner whatever, as by means of screws, &c. The pole-pieces may be made of cast-iron. With the exception of the flat faces b, c, and d, the entire surface of the pole-piece should be rounded in order to prevent or lessen the escape of the lines of force, which, as is well known, takes place most at ridges and angles. The lines of force pass continually between the two field-magnets, and the disk-armature moves continually through the space which they occupy, whereby the magnetism is utilized to the maximum effect.

I have thus far described a system of field-magnets having four pairs of poles; but it is evident that six, eight, or any other number of pairs may be provided, opposite poles being placed in coincidence in the two magnets and the poles of each being alternated. In this case the magnetic cores will form hexagons, octagons, or other polygons; or they may be made circular. The pole-pieces may be fixed at the angles of these polygons or at the middle of their sides. Fig. 7 shows a hexagonal magnet with the pole-pieces fixed at the angles. Fig. 8 shows a hexagonal magnet with the six pole-pieces arranged midway of the angles, and Fig. 9 shows a circular core with six pole-pieces.

If desired, a bipolar magnet may be employed, consisting of two strong electro-magnets of the form shown in Fig. 10, arranged parallel with their opposite poles set face to face. In this case the pole-pieces should be in the shape of sectors.

I will now proceed to describe the winding of the armature.

In the machines heretofore constructed the armature is composed of a copper band wound in the form of a zigzag or of spirals wound around the center of the armature. In both cases the armature has a considerable space in which there is no copper, and, further, in the latter case the separate coils are made of several convolutions, the latter becoming gradually smaller, so that the electro-motive force due to these additional convolutions is insignificant, and, what is more, the interior resistance is increased.

I have invented a novel metallic winding, in which each turn is divided in such manner that one of its halves is on one side of the armature and the other half is on the other side. Furthermore, the several coils forming the armature have all the same surface. This result is obtained not by simple arrangement of flat spirals arranged in oblique planes, but by arranging the two halves of each convolution in such manner that they are in different and parallel planes.

I will first describe the construction shown in Figs. 11 to 15. The winding is constructed of strips of copper, sawed lengthwise, of the outline shown in Fig. 11. This copper strip is bent around a mold, in order to give it the polygonal form shown in Fig. 12. The outer ends, $m\,m$, of the divided portion of each strip are connected, not to each other, but to the corresponding ends of the two adjacent strips—that is to say, to the next preceding and succeeding ones.

Fig. 12 shows parts of two strips, one divided arm of each being broken away. The ends $m\,m$ are preferably united by soldering, and being first confined by little clamps or caps $r\,r$, such as are shown in Figs. 13 and 14. By thus connecting together the outer ends of the successive copper strips the several convolutions are united in one continuous spiral, which constitutes an uninterrupted circuit around the entire armature, being in this respect equivalent to any ordinary Gramme winding.

I have chosen the contour for the convolutions that is shown in Fig. 12 in order to obtain the greatest development of each convolution, and at the same time to facilitate the fitting together of the different convolutions into one another. I thus juxtapose a sufficient number of spirals to constitute the armature, and by uniting them in the manner described they form a continuous circuit around the entire armature. The armature-winding is divided into a certain number of parts, each of which constitutes one coil, the extremities of which are connected with the commutator-sections. This connection is made through the medium of prolongations $ff$ on certain of the copper strips, as shown in Figs. 12 and 15. These prolongations $ff$ are connected to the respective commutator-sections by means of metal strips or wires soldered or clamped to them in any known or customary way. In Fig. 15 I have shown a prolongation $f$ on every fifth copper strip, in which case each one of the armature coils is composed of five convolutions.

The insulation of the respective convolutions may be accomplished by any of the means now in use. I prefer to separate them from one another at the places where their mutual spacing is the widest, and to employ for this purpose little rubber rings $g\,g$, placed around them, as shown in Fig. 12. This makes the armature very light and open, and is preferable to embedding the convolutions in a mass or block of insulating material. By thus constructing the armature with air-spaces between the separated laminæ it is made to act as a ventilator to keep itself cool.

Instead of using a separate copper strip for each convolution, as in Fig. 11, one uninterrupted strip might be used for a great number of successive convolutions; but in such case the strip should be of the shape shown in Fig. 16. This strip may be made of any desired length.

Another mode of constructing the armature is shown in Figs. 17, 18, and 19. Fig. 17 is a plan of the strip of copper from which the coils are made. Fig. 18 is a perspective view of one of the convolutions, showing parts of two copper strips. Fig. 19 is a fragmentary diametrical section of the armature and pole-pieces. The copper strip shown in Fig. 17 is formed with a long arm, $h$, turned back on one side, and with a short arm, $i$, on the opposite side. The strip is bent in the manner shown in Fig. 18, both arms being bent outwardly at right angles at $j\,j$, and the long arm, $h$, of each strip being then carried across diagonally to the next adjoining strip in the series, and connected with the short arm, $i$, on the latter. This short arm is bent around the end of the long arm; or the two may be connected through the medium of a clamp, being in either case soldered together, by preference. The bending outwardly of the portions $j\,j$ makes the outer portion of the armature much wider than the remaining portion, so that it assumes the form of a ring or flange, as will be evident from an examination of Fig. 19. This outer or flanged portion comes outside of the pole-pieces of the field-magnets. Outside of the armature is arranged a piece of soft iron, F, which extends across over both poles and acts to divert the lines of force outwardly from the poles in order that they may cross the expanded or flanged portion of the armature, thereby rendering the latter effective. This plate F acts chiefly upon the portions h h of the armature - winding, which extend obliquely across the outer part of the armature.

The undivided portion of each copper strip, or the part thereof nearest the center of the armature, is formed on its opposite sides either with notches o o or with projections p p, as shown, respectively, in Figs. 12 and 18, by means of which the circular metal plates C C are engaged with the armature-winding. These plates have annular ribs or grooves, as the case may be, which fit into the notches or into which the projections fit. In Fig. 15 the plate C is shown with an annular projection, q, engaging the notches o o in the copper strips. When the two plates C C are drawn together by their screws or bolts, the winding is clamped firmly in position and all displacement of the spirals is prevented.

In order to further prevent the armature from getting out of shape, it may be of advantage to introduce some pieces of wood between the outer ends or heads of the respective convolutions. Finally, the whole is to be bound together by means of a ligature consisting of several turns of wire or strips of sheet-brass wound around the periphery and soldered together, as shown at t in Figs. 15, 22, and 19. Care should be taken to insulate the convolutions from this ligature, which is best done by interposing pieces of mica or other material, u u, as shown.

The construction shown in Fig. 20 may be adopted, if desired, in order to permit of placing more of the spirals in the armature. In place of the undivided portion or end of the copper strip there is substituted for each convolution a strip, k, of thinner metal, which occupies the inner portion of the convolution, or the side thereof toward the center of the armature. The strip k has the same conductivity as the thicker metal which forms the outer portion of the convolution, this being accomplished by making it of greater width. By this construction the spirals are made very compact.

The principle of the division of each convolution into two halves, as I have hereinabove described, may be applied with advantage in constructing an armature with a zigzag winding in such way that all the space in the armature shall be filled with copper. Fig. 22 is a diagram showing an arrangement of this class. Another construction of the armature is shown in Fig. 23. Two wheels, Q, of which only one is shown, are employed, having spokes or arms Q' Q'. One of the wheels being placed on a table and the winding being prepared in advance, the latter is placed upon the former, and when the second wheel is applied confined in place between the spokes of the two wheels, the latter being drawn together by screws or otherwise.

For collecting by the commutator the currents induced in the windings I may employ different arrangements which permit of grouping the coils in quantity or in series.

If the number of convolutions forming the winding is divisible by four, (the number of the magnet-fields,) the coils may be connected directly to the respective commutator-sections. By employing four brushes connected together in pairs, the two diametrically-opposite brushes constituting one pair and the other two brushes the other pair, the arrangement for grouping in quantity is attained. One may also obtain the same result by employing only two brushes, provided the coils are connected together in pairs on diametrically-opposite sides of the armature.

If the number of coils is not divisible by two, (always in the case of four magnetic fields,) I establish the connections in the manner shown in Fig. 24. In this case all the coils are in tension, whereby nearly double the electro-motive force of the previous arrangement is obtained; but the intensity of the current will be less than half. Finally, if the number of coils is divisible by two, but not by four, I may make the connections in the manner shown in Fig. 25. The coils are thus joined in tension, and as the commutator-sections diametrically opposed are connected together those sections which apparently are not connected to any coil are in reality in communication with the coil on the opposite side.

In consequence of there being four pairs of magnetic poles arranged at right angles the current flows in the same direction in those parts of the armature which are diametrically opposite. There are thus four different circuits in the armature, the difference in potential being always greatest at right angles. The currents may thus be taken off by four brushes arranged at right angles if the coils are connected directly to the commutator-sections, or by two brushes only placed at right angles to one another if the diametrically-opposite coils are connected either directly or to the commutator-sections.

The connections between the coils on the opposite sides of the armature and between the several coils and the commutator-segments are made by wires which cross freely through the open space in the middle of the armature between the two plates C C.

The armature-winding is necessarily insulated from these plates. This may be done by a ring, y, of insulating material, as shown in Fig. 15, on which is formed the annular rib q, which enters the notches o o in the copper strips. The outer or peripheral portion of the winding must also be insulated from the peripheral ligature t, above described, which may be accomplished by putting little plates, u u, of mica around the armature before applying this ligature.

My invention is not necessarily confined to making the armature-winding of strips of copper, (or other metal;) but my invention may be partially utilized in the construction of an armature wound with wire, if a suitable annular core is provided around which to wind the wire in order to prevent displacement thereof.

I am well aware that disk-armatures have been made with overlapping coils of wire, the several coils occupying oblique planes around the armature and each coil being made up of numerous concentric turns of wire. My armature is distinguished from those of such construction by having its coils in planes parallel with the opposite faces of the armature and by having its separate convolutions arranged successively in advance of one another.

What I claim as my invention is, in a magneto or dynamo electric machine or electromotor of the disk type, the following defined novel features or combinations, substantially as hereinbefore specified, namely:

1. A disk-armature wound with flat overlapping coils the separate convolutions of which are arranged successively in advance of one another.

2. A disk-armature wound with flat overlapping coils the separate convolutions of which are successively in advance of one another and occupy two planes parallel with the sides of the armature, one half of each convolution being in a plane on one side of the armature and the other half thereof in a plane on the other side of the armature.

3. A disk-armature wound with flat overlapping coils the separate convolutions of which are successively in advance of one another, and which are composed of metal strips arranged with their edges presented perpendicularly to the opposite faces of the armature.

4. A disk-armature wound with flat overlapping coils the separate convolutions of which are successively in advance of one another, and which are composed of metal strips arranged with their edges presented perpendicularly to the opposite faces of the armature and in two parallel planes, one half of each convolution being bent in one direction in a plane on one side of the armature and the other half being bent in the opposite direction in a plane on the other side of the armature.

5. A disk-armature wound with flat overlapping coils, each convolution of which is constructed of a longitudinally-slitted strip of metal, the arms of which are bent in opposite directions and the extremities of which are connected to the corresponding extremities of the adjacent strips.

6. A disk-armature wound with flat overlapping coils the separate convolutions of which consist each of a metal strip slitted longitudinally, with its divided portions bent in opposite directions, and with its undivided portion arranged at the inner part of the armature and its opposite extremities extending to the periphery thereof and there connected, respectively, with the next successive strips.

7. A disk-armature wound with flat overlapping coils, each convolution of which is constructed of a strip of metal, one half of which is bent around in one direction on one side of the armature and the other half of which is bent in the opposite direction on the other side of the armature, the successive convolutions being connected together serially, and the entire winding being divided into coils or groups of convolutions with a connection from each group to the corresponding commutator-section.

8. A disk-armature wound with flat overlapping coils the separate convolutions of which are spaced apart in such manner as to leave free air-spaces between them for the ventilation and cooling of the winding.

9. A disk-armature wound with flat overlapping coils the convolutions of which are arranged successively in advance of one another and constructed of metal strips arranged edgewise to the opposite faces of the armature and connected to the armature-shaft through the medium of plates applied to opposite sides thereof and between which it is clamped, whereby an annular space is formed between said plates and within the armature-strips, with annular coinciding and interlocking projections and recesses on said plates and metal strips, respectively, and circuit-connections for coupling the terminals of the respective coils passing through the space between said plates.

10. A disk-armature wound with flat overlapping coils the separate convolutions of which are arranged successively in advance of one another and constructed of metal strips arranged edgewise, combined with a peripherally-applied ligature to prevent the expansion of the winding.

11. A disk-armature wound with flat overlapping coils, each convolution of which is constructed of a longitudinally-slitted strip of metal, the arms of which are bent around in opposite directions, with their extremities extending to the peripheries of the armature, and with metal clamps connecting together the extremities of the successive strips.

12. In a disk-dynamo, the combination, with the disk-armature, of field-magnets presenting oppositely-polarized pole-pieces on opposite sides of the armature, and iron plates arranged to cross the periphery of the armature from one pole-piece to the other and at a short distance beyond the pole-pieces, whereby the lines of force are diverted outwardly from the pole-pieces.

13. In a disk-dynamo, the combination, with field-magnets presenting oppositely-polarized pole-pieces face to face, of a disk-armature the winding of which extends laterally at the periphery beyond the pole-pieces, and with iron plates arranged to cross the periphery of the armature opposite the pole-pieces, whereby the lines of force are diverted outwardly through the laterally-extended portion of the armature-winding.

14. A disk-armature wound with flat overlapping coils the convolutions of which are constructed of metal strips arranged edgewise, and wherein the portions of the convolutions on the inner side of the armature are made of thinner metal than the portions thereof toward the periphery of the armature, the same conductivity being maintained throughout the convolutions.

In witness whereof I have hereunto signed my name in the presence of two subscribing witnesses.

FRANCIS JEHL.

Witnesses:
ROBT. M. HOOPER,
AMAND RITTER.